United States Patent [19]

Musgrave

[11] 4,258,495
[45] Mar. 31, 1981

[54] INTERACTING SPRINGS

[76] Inventor: Daniel D. Musgrave, 8201 Caraway St., Cabin John, Md. 20731

[21] Appl. No.: 3,664

[22] Filed: Jan. 15, 1979

[51] Int. Cl.³ .......................... F41C 25/02; F16F 1/22
[52] U.S. Cl. ........................................ 42/50; 267/165
[58] Field of Search ................... 42/50; 267/158, 160, 267/164, 165

[56] References Cited

U.S. PATENT DOCUMENTS

| 3,964,199 | 6/1976 | Musgrave | 42/50 |
| 3,999,319 | 12/1976 | Musgrave | 42/50 |
| 4,205,474 | 6/1980 | Musgrave | 42/50 |

*Primary Examiner*—Charles T. Jordan

[57] ABSTRACT

Springs adapted for long-term installation in a limited space, in a minimum-stress condition. When thrust is desired, the springs are stressed by adjusting the position of some components, resulting in a tendency to expand.

28 Claims, 11 Drawing Figures

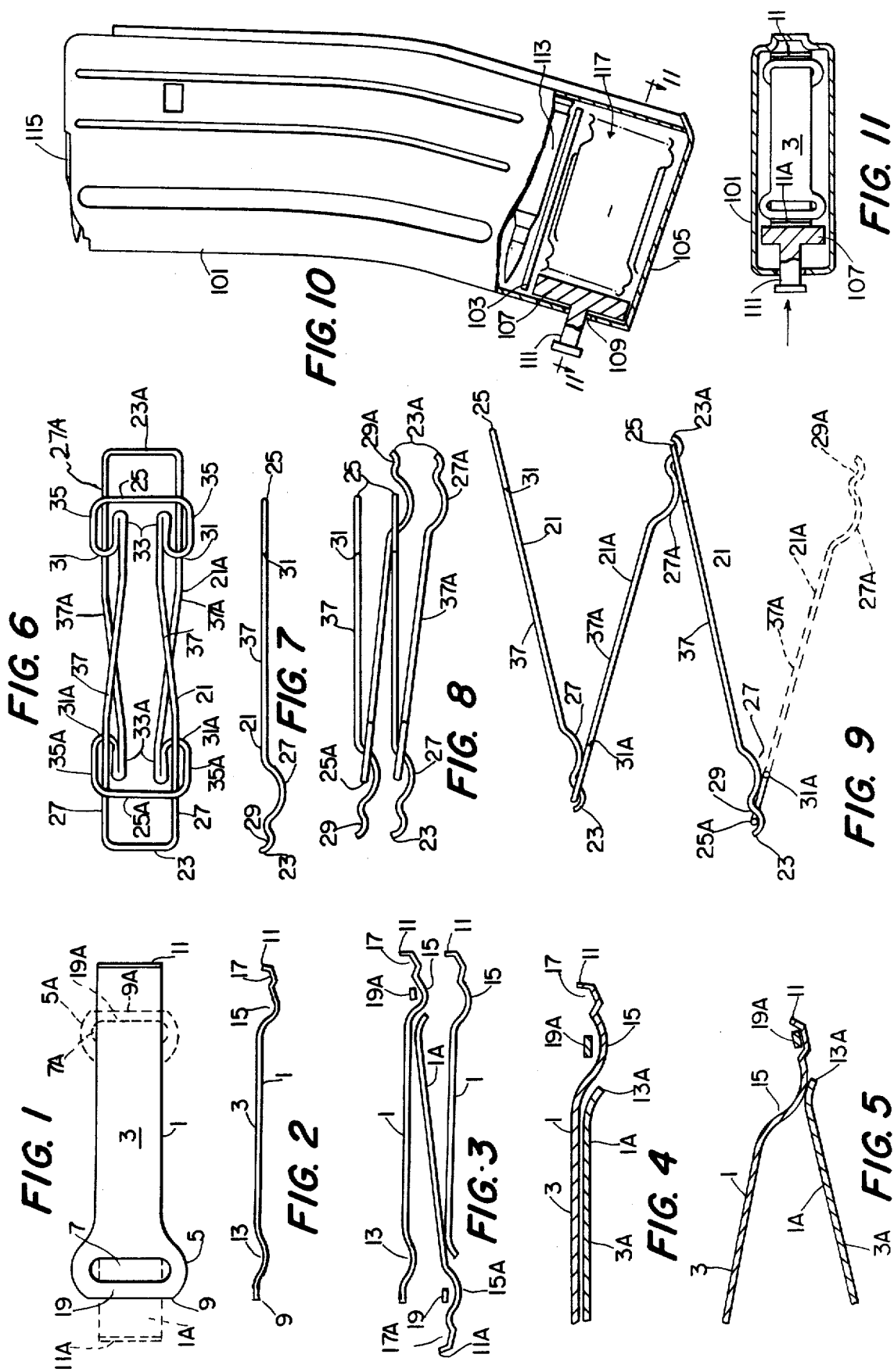

INTERACTING SPRINGS

Many types of mechanical equipment include springs which must stand-by in a stressed condition for long periods of time. An obvious limitation on such springs is the possibility that resilience may be lost, thus rendering the mechanism inoperable.

An example of this problem is found in the ordinary cartridge magazine for firearms. For military use it would be desirable to fill the magazine with cartridges at a factory and issue it to the user in a protective wrapper. This cannot be done because of the limitation of time for keeping the magazine spring stressed. As a result, magazines and ammunition must be stored, shipped, and issued separately, an inefficient and inconvenient procedure.

The principal object of this invention is to provide springs which can be installed in a minimum space, while in a minimal-stressed condition, and can be adjusted within the same space to a highly-stressed condition.

Another object of this invention is to provide such springs which will be economical to fabricate.

These and other objects of the present invention will become apparent upon reference to the following specification, taken in connection with the accompanying drawings, wherein:

FIG. 1 is a top view of a pair of interacting springs.

FIG. 2 is a side elevation of one of the springs shown in FIG. 1.

FIG. 3 is a side elevation showing how the interacting springs are assembled in a stack.

FIG. 4 is a sectioned view showing how the assembled springs can remain relaxed.

FIG. 5 is a sectioned view showing how the assembled springs can be stressed.

FIG. 6 is a top view of a pair of interacting springs of different construction from those shown in FIG. 1.

FIG. 7 is a side elevation of one of the springs shown in FIG. 6.

FIG. 8 is a side elevation showing how the springs shown in FIG. 6 are assembled in a stack.

FIG. 9 shows the stack in FIG. 8 stressed and expanded.

FIG. 10 is a side elevation, partly sectioned, of a cartridge magazine incorporating interacting springs.

FIG. 11 is a longitudinal section taken in the plane 11—11 on FIG. 10, to show how the interacting springs are stressed.

The drawings have been prepared for the purpose of disclosure and they should not be construed as limiting the invention. No particular magazine is shown. The springs shown are merely examplary. In actual practice, it may be desirable to construct the springs with portions varying in configuration from that is shown herein.

Referring to the drawing in detail, FIG. 1 shows a spring 1 which may be formed out of sheet metal or any other suitable material. Spring 1 includes a substantially flat leaf portion 3 and an enlarged portion 5 through which is formed a slot 7. The end of the spring near portion 5 is identified by numeral 9. The opposite end is identified by numeral 11.

As may be seen in FIG. 2, spring 1 is not entirely flat. Near end 9 a transverse groove 13 is formed. Near end 11 is formed an arcuate portion 15, and a recess 17 which serves as a detent, as will be explained below. One edge of the recess is formed by end 11 which is bent up as may be seen in FIG. 2.

In FIG. 1 the portion of the spring between slot 7 and end 9 is identified by numeral 19. Also shown in FIG. 1, in broken lines, is a second spring 1A which is similar to spring 1 but oriented oppositely. Parts 5A, 7A, 9A, 11A and 19A of spring 1A correspond to parts 5, 7, 9, 11, and 19 of spring 1, and are so numbered in FIG. 1. Spring 1A also has oarts 3A, 13A, 15A and 17A which are not numbered in FIG. 1 but which correspond to parts 3, 13, 15, and 17 of spring 1.

In FIG. 1, a portion of spring 1 has been inserted through slot 7A of spring 1A. A plurality of springs such as 1 and 1A can thus be assembled in a stack in the manner disclosed in FIG. 3.

Each spring in the stack is oriented oppositely to the spring or springs immediately adjacent to it. This may be observed in FIG. 3 where springs 1 have ends 11 on the right, while spring 1A has end 11A on the left. To permit the assembled stack to occupy a minimum of space, portion 19A is engaged in arcuate portion 15 and similarly portion 19 is engaged in arcuate portion 15A. This allows the springs to collapse into a closely nested stack as may be understood from FIG. 4.

It will be noted in FIG. 4 that the parts of springs 1 and 1A are very close together, yet each spring is relaxed. For clarity of disclosure only part of transverse groove 13A is shown in FIG. 4 and FIG. 5. Because of the way in which the springs are assembled in FIG. 3 and FIG. 4, half of the springs in the stack will have their ends protruding somewhat from each end of the stack.

When it is desired to cause the stack to expand the protruding ends are pushed into the stack, while still keeping the several springs engaged together. The resulting condition is shown in detail in FIG. 5 where end 11 of spring 1 has been pushed to the left. As a result of the movement, arcuate portion 15 of spring 1 is now engaged near the edge of the slot in spring 1A, which is also the part of groove 13A appearing in FIG. 5. The springs will therefore tend to pivot apart as shown generally in FIG. 5, with portion 13A serving as a fulcrum.

Means for moving the interacting springs will be disclosed hereinafter. To expedite such moving, one or more of the springs may be coated with a lubricant.

FIG. 6 shows a pair in interacting wire springs 21 and 21A. A side elevation of spring 21 is shown in FIG. 7. In FIG. 6 it will be noted that spring 21 has ends numbered 23 and 25, while spring 21A has ends numered 23A and 25A. The construction of the two springs is identical, but they are assembled with their ends oppositely oriented, as will be explained hereinafter.

As may be seen in FIG. 7 spring 21 has arcuate portion 27 formed near end 23. (There are two such arcuate portions but only one can be seen in FIG. 7). Spring 21 also has two small curved detents 29, of which only one can be seen in FIG. 7. The purpose of the detents will be explained later.

Near end 25, spring 21 is provided with a pair of fulcrums 31 and a pair of return portions 33 which, with sides 35 and end 25, form a pocket. The two longitudinal portions of the spring are indicated by numerals 37.

Parts 27A, 29A, 31A, 33A, 35A and 37A of spring 21A correspond to parts 27, 29, 31, 33, 35 and 37, repectively, of spring 21.

In FIG. 10 there is shown a cartridge magazine having a typical casing 101, a typical cartridge follower 103, and a floor 105. Between the follower and the floor is installed a stack of interacting springs 117, which is substantially similar in arrangement to that shown in FIG. 3. Stack 117 is only shown in a simplified way in FIG. 10.

Also installed between the follower and the floor, at the front of the magazine, is pusher block 107 which can be made of any suitable material. The block has a lug 111 which extends through a hole 109 in the front of the magazine. A cartridge 113 is visible on follower 103, and another cartridge 115 is visible at the top of the magazine.

As stack 117 is in the condition shown in FIG. 3 and FIG. 4 it merely supports follower 103 without exerting any significant thrust. The follower, of course, is supporting not only cartridge 113, but also a plurality of cartridges, which are not visible in the drawings, between cartridges 113 and 115. The magazine can be stored indefinitely with its spring (that is, stack 117) in the relaxed condition.

The spring is activated by pushing block 107 into the magazine as shown in FIG. 11. The block pushes against end 11A, while end 11 is pushed against the rear wall of the casing. The interacting springs are thus pushed together and assume the condition shown in FIG. 5. Reacting on floor 105, they exert significant thrust on follower 103.

A stack of wire loop interacting springs of the type disclosed in FIGS. 6 to 9, can be installed and used in a manner similar to that described for stack 117.

The stack of wire loop springs would be installed substantially as they appear in FIG. 8, and the stack would thus be relaxed, with the arcuate portions of the several springs in the stack nested. Ends 23 are protruding from one end of the stack and ends 23A are protruding from the other end of the stack.

When these ends are pushed into the stack by any convenient means, (such as the arrangement described for FIG. 11) the stack of wire loops will assume a stressed condition. If permitted to expand it will then appear somewhat as shown in FIG. 9.

To clarify the method by which the stack expands, the lower spring 37A in FIG. 9 is partly sectioned. It can thus be seen that end 25A is engaged in detent 29 of adjacent spring 37. At the same time, fulcrum 31A of spring 37A is engaged under arcuate portion 27 of spring 37. It is apparent in FIG. 9 that the interaction of the springs will tend to expand the stack. When the several springs in the stack are forced to interact while in a confined space, they will assume complex shapes to adapt themselves to such confinement, while stressed.

In the drawings it will be noted that the assembly of either the wire loop or the sheet metal springs into a stack is relatively simple. The sheet metal type is assembled by inserting the end of a leaf into the slot on another spring. Several springs can thus be assembled into a compact stack as disclosed in FIG. 4. Each individual spring in the stack is oriented oppositely to the spring or springs adjacent to it.

Spring 1 need not necessarily be made of metal. Any suitable resilient material can be used; for example, resilient plastics.

The wire loop type is assembled by inserting end 23 or 23A through the space between end 25 or 25A and return portions 33 or 33A. Arcuate portions 27 or 27A are then positioned substantially under end 25 or 25A, as the case may be. Additional springs are inserted in like manner to complete the stack, substantially as disclosed in FIG. 8.

In some instances it may be advantageous to have one or more of the members magnetized, as an aid to assembling or handling the stack.

The two embodiments shown were selected merely for convenience in disclosing the invention. It is possible to practice the invention using embodiments varying in detail from those used as examples herein. It is not intended that the disclosure be construed as a limitation of the invention.

There is thus disclosed simple interacting springs which can remain in a relaxed condition in a minimum space for long periods of time, and can be activated instantly when needed.

The word member as used herein may indicate any of various types of springs intended for assembly in a stack, including a flat spring such as 1, or a wire spring such as 21. The words engagement means may be used to indicate elements such as slot 7 in a flat member or the pocket in a wire member. Other forms of engagement means can be provided. Obviously the slot or the pocket are also adapted to serve as guide means when two or more members are moving inter se.

Such movement can be limited to a predetermined extent by stop means such as ends 11 and 11A, or ends 23 and 23A which are shaped so as to prevent accidental disengagement of the members due to overtravel. Other forms of stop means can be provided.

The engagement means can also be provided with hinge means to permit pivoting of two or more members inter se, while engaged. It is possible to provide engagement means which is also adapted to serve as hinge means. Slot 7 is an example of such a capability.

The disclosed members are adapted to function as levers turning on fulcrum means positioned on other similar members. Such fulcrum means are shown at 13A in FIG. 4 and FIG. 5, and at 31 and 31A in FIG. 6 and FIG. 9. The members actually comprise flexible, or resilient, levers.

The members include portions which are adapted to serve as activation means. The activation means is adapted to stress the members by distorting them when the several members in a stack have a certain relationship such as that disclosed in FIG. 5 or FIG. 9. Arcuate portions 15, 15A, 27 and 27A are examples of such activation means which are adapted to bear against fulcrum means on another member. Other forms of activation means can be provided.

It should be noted that when a stack of members is stressed, the distortion will occur in various parts of the members, including the activation means.

The members include detent means such as 17 and 29 which can engage another member in a stack to maintain proper engagement of the two. Without the detent means the several members in a stack might tend to shift position relative to each other in such a way as to diminish the desired thrust. Other forms of detent means can be provided.

I claim:

1. Interacting spring comprising:
a plurality of resilient members arranged for pivotable engagement in a first compact zigzag relationship in which said members are relaxed, said members being moveable inter se while continuing said engagement to a second compact zigzag relationship in which means on said members are positionally adapted to pivot said members apart whereby said plurality of members tends to expand in a predetermined direction, each member provided with a detent means positionally adapted to retain said member in said second relationship.

2. Interacting spring comprising:

a plurality of resilient members, each of said members including lever means and fulcrum means;

said members being arranged for pivotable engagement in a first compact zigzag relationship wherein said members are relaxed; and said members being moveable inter se while continuing said engagement to a second compact zigzag relationship wherein said lever means on a first member of said plurality cooperates with said fulcrum means on a second member of said plurality to pivot said first member relative to said second member thereby tending to expand said plurality of resilient members in a predetermined direction, each member provided with a detent means positionally adapted to retain said member in said second relationship.

3. Interacting springs as set forth in claim 1 or claim 2 wherein each of said members is formed substantially in one plane.

4. Interacting springs as set forth in claim 1 or claim 2 wherein said members are adapted for nesting when in said first relationship.

5. Interacting springs as set forth in claim 1 or claim 2 wherein said members are adapted for flexing during movement from said first relationship to said second relationship.

6. Interacting springs as set forth in claim 1 or claim 2 wherein at least one of said members is coated with a substance having a low coefficient of friction.

7. Interacting springs as set forth in claim 1 or claim 2 wherein said members are stressed when in said second relationship.

8. Interacting springs as set forth in claim 1 or claim 2 wherein ends of adjacent members of said plurality are staggered when in said first relationship.

9. Interacting springs as set forth in claim 1 or claim 2 wherein ends of adjacent members of said plurality are substantially flush when in said second relationship.

10. Interacting springs as set forth in claim 1 or claim 2 wherein adjacent members of said plurality are oppositely oriented.

11. Interacting springs as set forth in claim 1 or claim 2 wherein at least one of said members is magnetized.

12. Interacting springs as set forth in claim 1 or claim 2 wherein said members are formed of wire.

13. Interacting springs as set forth in claim 1 or claim 2 wherein said members are formed of sheet metal.

14. Interacting springs as set forth in claim 13 wherein each of said members is provided with a slot adapted for engaging another of said members.

15. In a cartridge magazine in combination: a casing for storing cartridges, said casing including a floor and an exit port; a follower slideable in said casing and adapted for urging said cartridges toward said port; interacting springs engaging said follower and said floor and comprising:

a plurality of resilient members arranged for pivotable engagement in a first compact zigzag relationship in which first relationship said members are relaxed;

said members being moveable inter se while continuing said engagement to a second compact zigzag relationship in which second relationship means on said members are positionally adapted to pivot said members apart thereby causing said plurality to react against said floor and thrust said follower toward said port;

detent means provided on each member positionally adapted to retain said members in said second relationship; and means for moving said members from said first relationship to said second relationship.

16. A spring assembly for selectively providing a resilient urging force, said spring assembly comprising:

a plurality of elongated resilient members each of which includes first and second ends, said members arranged in a stacked relationship with their first and second ends arranged in an alternating relationship;

the first end of one of said members pivotably connected to the second end of another member of one side of said one member and the second end of said one member pivotably connected to the first end of another member on the other side of said one member, said pivotal connections permitting both relative pivotable motion between said connected members and relative motion in a longitudinal direction between said connected members from a first position to a second position;

complementary fulcrum and lever means associated with said connected ends, said complementary fulcrum and lever means engaging one another when said members are moved from their first position to their second position to cause said connected members to resiliently pivot apart relative one another to cause said stack to resiliently expand.

17. A spring assembly for selectively providing a resilient urging force, said spring assembly comprising:

a plurality of elongated resilient members each having first and second ends, said members arranged in a stacked relationship with their first and second ends alternating with one another and with selected first and second ends pivotably connected together to define a zigzag configuration for said stack;

said pivotal connections permitting relative pivotable motion between the so-connected members and relative longitudinal motion between the so-connected members from a first position and a second position;

means defined between the ends of said so-connected members for causing said so-connected members to resiliently pivot relative one another;

said means for pivoting inoperative when said members are in said first position and operative when said members are moved relative to one another to said second position to cause said stack to resiliently expand.

18. The spring assembly claimed in claim 16 or claim 17 wherein:

said elongated resilient members are formed from leaf spring steel stock.

19. The spring assembly claimed in claims 16 or claim 17 wherein:

said elongated resilient members are formed from wire spring stock.

20. The spring assembly claimed in claim 16 or claim 17 wherein:

said elongated resilient members include a detent means to retain said connected members in said second position.

21. The spring assembly claimed in claim 16 or claim 17 wherein:
   said elongated resilient means include stop means to prevent relative longitudinal movement beyond said second postion.

22. The spring assembly claimed in claim 16 or claim 17 wherein:
   said first end of each of said resilient members includes a slot formed therethrough substantially transverse to the longitudinal axis of said member for receiving the second end of a connected member therethrough.

23. The spring assembly claimed in claim 22 wherein:
   the second end of each of said members includes an arcuate surface portion, said arcuate surface portion, when said members are in their connected first position, extending through said slot and said arcuate surface portion, when said connected members are in their second position, engaging a surface portion of the other of said connecting members to cause said members to resiliently pivot apart.

24. The spring assembly claimed in claim 20 wherein the first end of said member includes a spanning piece transverse to the longitudinal axis of said member and the second end of its associated connected member includes a groove transverse to its longitudinal axis defining said detent means for receiving said spanning member when said members are in their second position.

25. A cartridge magazine for containing a plurality of cartridges, said cartridge magazine comprising:
   a housing having a floor and a cartridge exit port, a cartridge follower intermediate said floor and said exit port for movement to and from said exit port and selectively operable resilient biasing means for biasing said cartridge follower toward said exit port, said resilient biasing means including:
   a plurality of elongated resilient members each having first and second ends, said members arranged in a stacked relationship with their first and second ends alternating with one another and with selected first and seconds ends pivotably connected together to define a zigzag configuration, said pivotal connections permitting relative pivotal motion between connected members and relative longitudinal motion between said members from a first to a second position;
   means for causing said so-connected members to resiliently pivot relative to one another, said means for pivoting inoperative when said members are in said first position and operative when said members are in said second position to resiliently urge cartridges towards said cartridge exit port.

26. The cartridge magazine claimed in claim 25 further comprising:
   actuating means for causing said so-connected members to be moved from said first position to said second position.

27. The cartridge magazine claimed in claim 26 wherein said actuating means comprises:
   a force transmitting block located within said magazine for selectively bearing against at least some of the connected ends of said connected resilient spring members on at least one side thereof and operable to force said resilient spring members to said second position.

28. A selectively operable spring assembly for selectively providing a thrust force, said spring assembly comprising:
   at least two resilient members pivotably connected at one end thereof, said connection permitting both relative movement in a longitudinal direction and relative pivotal motion therebetween;
   said resilient members movable between a first position and a second position relative to one another;
   lever and fulcrum means defined between said so-connected ends of said resilient members for resiliently pivoting said resilient members apart when said members are moved to their second position.

* * * * *